July 31, 1956 R. G. LE TOURNEAU 2,756,846
ADJUSTMENT FOR ELECTRICALLY CONTROLLED BRAKE UNIT
Filed Jan. 30, 1952 2 Sheets-Sheet 1

INVENTOR.
ROBERT G. LE TOURNEAU
BY
*Lyon+Lyon*
ATTORNEYS

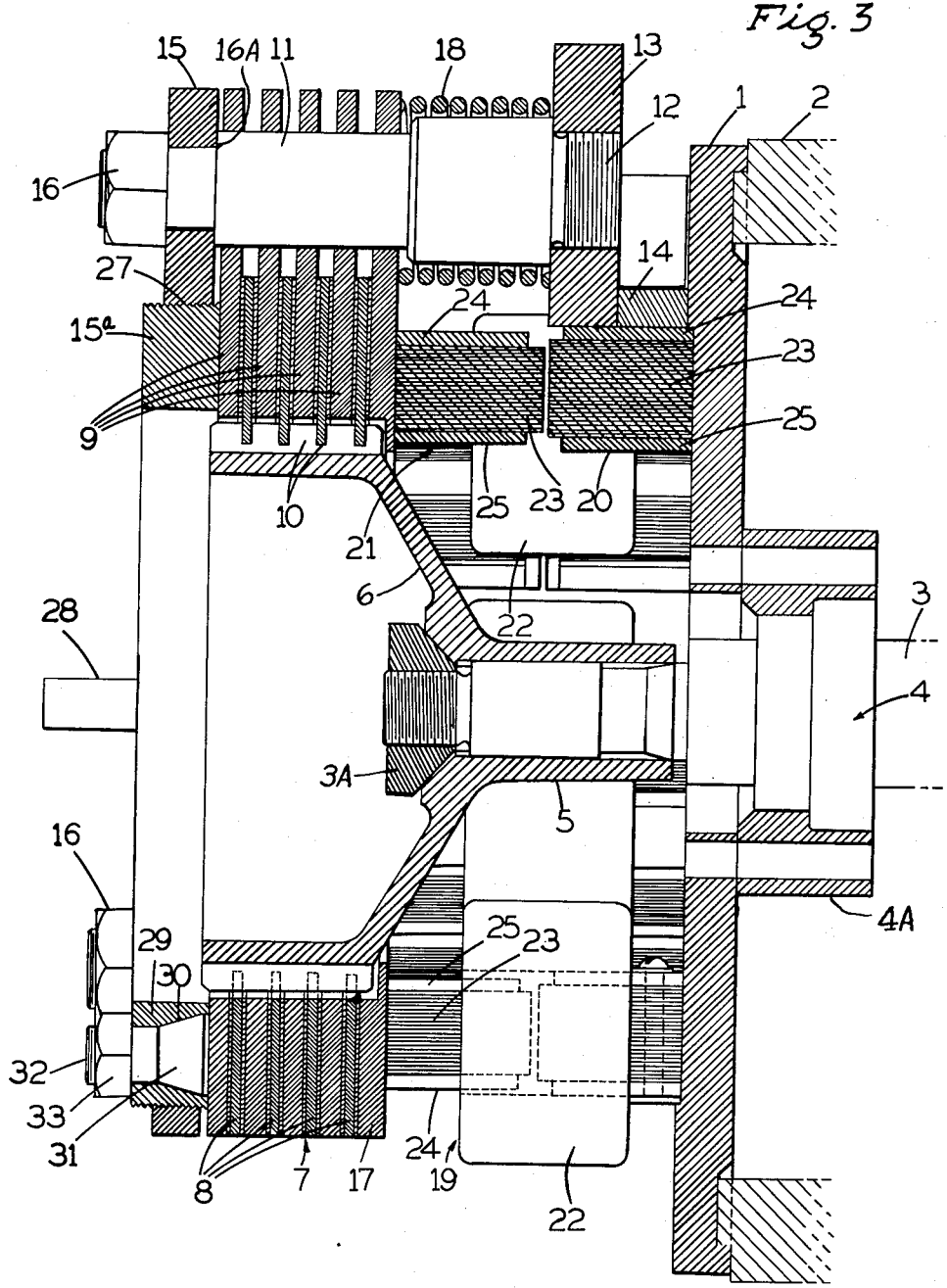

United States Patent Office 2,756,846
Patented July 31, 1956

2,756,846

ADJUSTMENT FOR ELECTRICALLY CONTROLLED BRAKE UNIT

Robert G. Le Tourneau, Longview, Tex.

Application January 30, 1952, Serial No. 268,969

12 Claims. (Cl. 188—171)

This application is a division of application Serial Number 33,118 filed June 15, 1948, now abandoned in favor of continuation-in-part application Serial No. 265,075 filed January 5, 1952.

This invention is directed to, and it is an object to provide, an improved spring-engaged, electro-magnetically released brake unit especially adapted, but not limited, for use on electric motors.

Another object of the invention is to provide an electrically controlled brake unit, which embodies a novel electro-magnet assembly which is designed for ease of manufacture, and smooth, positive operation to release the brake against the action of the springs.

A further object of the invention is to provide an electrically controlled brake unit, which includes a simplified but positive and accurate adjustment mechanism for the multiple brake disks of the unit.

An additional object of the invention is to provide an electrically controlled brake unit, which is especially adapted to be mounted in connection with, and supported by, one end wall of an electric motor in braking relation to the motor shaft.

A further object of the invention is to provide a practical and reliable brake unit, and yet one which will be exceedingly effective for the purpose for which it is designed.

These objects are accomplished by means of such structure and relative arrangement of parts as will fully appear by a perusal of the following specification and claims.

In the drawings:

Fig. 3 is an enlarged diametrical section of the brake unit.

Figure 1:
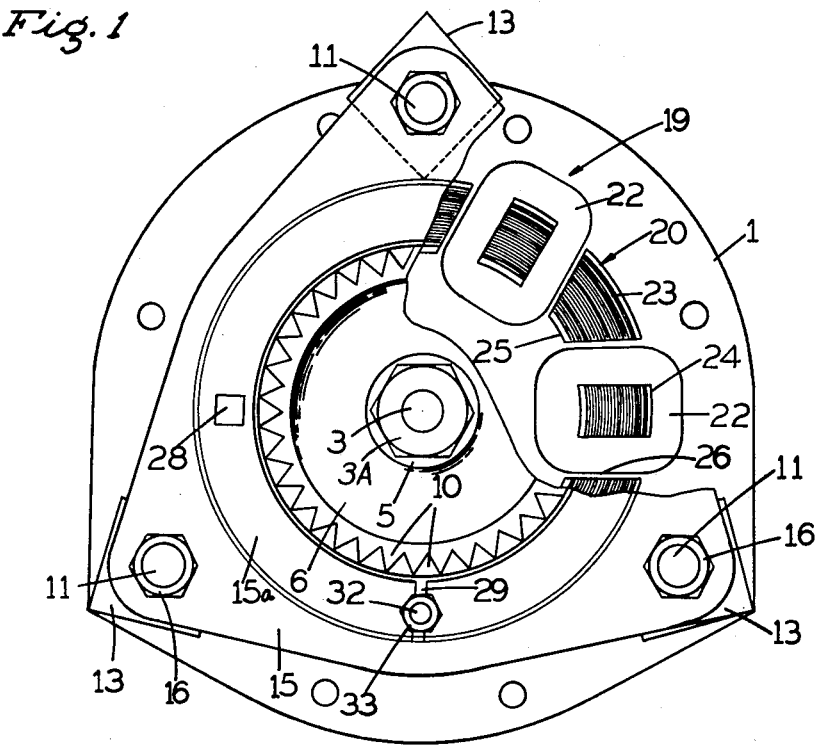
Fig. 1 is an outer end view, partly broken away, of the brake unit.

Referring now more particularly to the characters of reference on the drawings:

The brake unit is especially designed to be mounted in connection with, and supported by, one end wall 1 of an electric motor cage 2, which wall will hereinafter be defined as the inner end wall.

The electric motor shaft 3 projects through a bearing unit 4 carried in a supporting cage 4a which is secured to the inner end wall 1 by welding or other conventional means and such shaft extends some distance outwardly from the bearing unit.

Outwardly of the inner end wall 1 the shaft 3 projects in keyed relation to and through the hub 5 of an enlarged rotary bell or carrier 6 disposed in the main axially outwardly of said hub 5. The outer end of shaft 3 is threaded and mounts a fastening nut 3A which serves as a means for releasably securing the carrier on the shaft 3.

A multiple brake disk assembly, indicated generally at 7, surrounds the enlarged rotary bell or carrier 6 and said assembly includes, in alternate relation, rotatable brake disks 8 and non-rotatable brake disks 9.

The rotatable brake disks 8 are connected, at their inner periphery, by a saw tooth spline connection 10 between the disks and carrier 6 whereby said disks 8 are slidable axially of the carrier 6, but must rotate therewith. The non-rotatable brake disks 9 are of greater diameter, extending radially outwardly beyond the disks 8, and there axially slidably engage on a plurality of equally circumferentially spaced, longitudinal spindles 11. With this manner of mounting, the brake disks 9 each are free to move axially but are positively restricted against rotation.

At their inner ends the longitudinal spindles 11 are threadingly connected, as at 12, to rigid backing plates 13 mounted in connection with the inner end wall 1 by blocks 14.

At their outer ends, and axially outwardly of the multiple brake disk assembly 7, the longitudinal spindles 11 carry, in fixed relation, an outer end wall 15 secured in place by nuts 16, which clamp the end wall 15 against shoulders 16a on the spindles. These nuts 16 provide means for releasably securing the end member or wall 15 on the stationary spindles 11. This outer end wall includes an adjustment ring 15a which serves as the stop for the outer end of the multiple brake disk assembly 7.

The multiple brake disk assembly 7 includes, at its axially inner end, and as one of the non-rotatable brake disks 9, a floating inner brake disk, indicated generally at 17, and heavy-duty compression springs 18 surround the spindles 11 between the backing plates 13 and said floating inner brake disk 17. With this arrangement the springs 18 normally tend to axially compress the multiple brake disk assembly 7, whereby to impose a braking action on the carrier 6, and consequently on the motor shaft 3.

The multiple brake disk assembly is adapted to be electrically controlled or released by means of the following novel electro-magnet assembly:

An annular row, of electro-magnets, indicated at 19, is disposed in surrounding, concentric relation to the hub 5, but is spaced outwardly thereof. Each of such electro-magnets 19 includes a stationary armature 20 affixed to the inner end wall 1; a movable armature 21 fixed to the floating inner brake disk 17; and a coil 22 which surrounds adjacent end portions of the armatures 20 and 21, being fixed to the former. There is an air gap, as shown, existent between adjacent ends of the armatures 20 and 21 of each electro-magnet 19. Such electro-magnets 19 are wired together in a circuit (not shown) for simultaneous energization, and when this occurs the movable armatures 21 are drawn axially inwardly, i. e. toward the stationary armatures 20, which relieves the multiple disk brake assembly 7 from the force of the springs 18, permitting of unbraked rotation of the carrier 6 and the motor shaft 3. Upon deenergization of the magnets 19, the springs 18 act automatically and instantaneously to urge the floating inner brake disk 17, with the armatures 21 thereon, in an axially outward direction, so as to then re-impose the compression force on the multiple brake disk assembly 7, and to cause a braking action.

The annular and concentric rows of armatures 20 and 21 are formed in connection with the inner end wall 1 and the floating inner brake disk 17, respectively, in a novel manner:

As the arrangement is identical for each row, a description of the method of making and mounting the armatures 21 on the floating brake disk 17 will suffice for the purpose of illustration.

Figure 2:
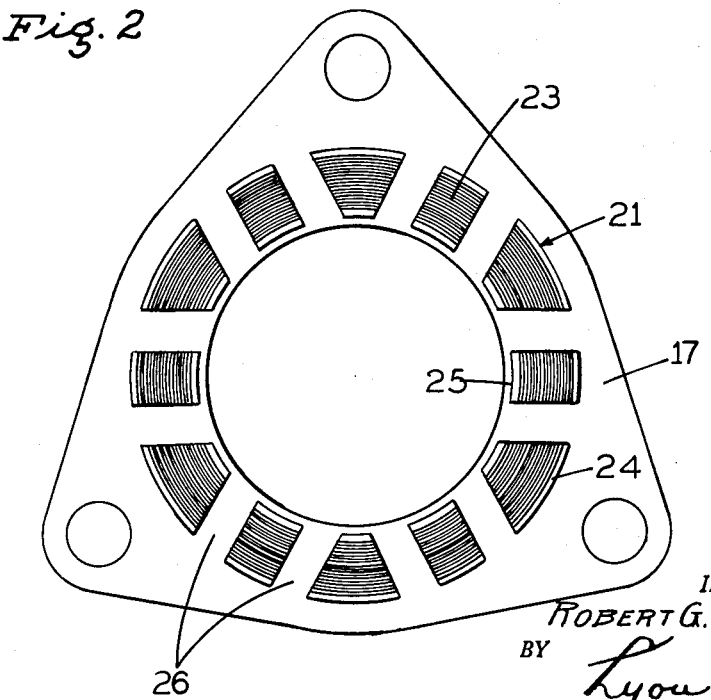
Fig. 2 is a face view of the floating inner brake disk, detached.

By reference especially to Fig. 2, the armatures 21 comprise a multiplicity of concentric annular lamination bands 23 reinforced by, and fixedly engaged between, annular, outer and inner retention bands 24 and 25.

At the outset the lamination bands 23, together with the retention bands 24 and 25, are continuous and are secured together in tight, unitary relation. Thereafter, this assembly is located on the floating brake disk 17 and is welded in place, and machined on its outer end or face, followed by machining or transverse cutting of the slots 26 to provide the separate armatures 21. The armatures 20, formed in like manner, have the coils 22 mounted on alternate cores or armatures 20 and 21, as shown.

The adjustment ring 15a is threaded, as at 27, into the outer end wall 15, and said ring is provided externally with opposed outwardly projecting pins 28 which may be engaged or driven to rotate the ring 15a to effect adjustment of the multiple brake disk assembly. In this manner adjustment to tighten or relieve the assembly 7 can be accomplished readily, and without the necessity of any special tools.

Normally, the adjustment ring 15a is maintained locked against rotation by means of the following device:

At one point in its circumference the adjustment ring 15a is split radially, as at 29, and a taper bore 30 extends through the ring parallel to its axis in the plane of said split. In other words, the split 29 intersects the taper bore 30. A taper plug 31 is engaged in the taper bore 30 and includes a stem 32 projecting out of the opposite or outer end of the ring, and a nut 33 is threaded on said stem. Upon tightening of the nut 33, the stem 32 and taper plug 31 are drawn outward, effecting an expansion of the ring 15a on opposite sides of the split 29 whereby to frictionally lock up said ring in any selected position of adjustment. In this manner the ring is normally held against accidental unloosening with consequent mal-adjustment of the multiple brake disk assembly 7.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a brake unit, a stationary supporting structure, a plurality of non-rotatable brake discs slideably mounted on said structure, a driving shaft journalled for rotation in said structure, a rotatable member having an enlarged annular brake disc carrier, means releasably securing said carrier on said shaft, a plurality of rotatable brake discs sandwiched between said non-rotatable brake discs and slideably mounted on said carrier for rotation therewith, said non-rotatable and rotatable brake discs comprising a multiple brake disk assembly, a stop mounted on said supporting structure beyond one end of the assembly, and releasable means normally acting to compress the assembly from the opposite end; said stop including a fixed outer end member having internally threaded portion and an axially adjustable externally threaded stop ring therein in engagement with the adjacent end of said multiple brake disk assembly for adjusting the spacing of the elements of said assembly without altering the effectiveness of said releasable means, said stop ring having a mean diameter substantially equal to the mean diameter of said disc assembly, and being coaxially arranged with said assembly, and permitting access to said releasable securing means.

2. A brake unit, as in claim 1, in which the stop ring is threaded into said end member, and releasable locking means arranged to normally prevent rotation of the ring.

3. A brake unit, as in claim 2, in which said locking means comprises a taper plug, the ring having a taper bore therewithin parallel to its axis, and means to urge the plug into the taper bore and to hold the same therein, the ring being split radially in intersecting relation to said taper bore.

4. A brake unit, as in claim 3, in which said plug-urging means is a stem thereon projecting beyond one end of the ring, and a nut threaded on the stem and bearing against said end of the ring.

5. In a brake unit, a stationary supporting structure, a plurality of non-rotatable brake discs slideably mounted on said structure, a driving shaft journalled for rotation in said structure, a rotatable member having an enlarged annular brake disc carrier, means releaseably securing said carrier on said shaft, a plurality of rotatable brake discs sandwiched between said non-rotatable brake discs and slideably mounted on said carrier for rotation therewith, said non-rotatable and rotatable brake discs comprising a multiple brake disk assembly, a stop beyond one end of the assembly, and releasable means normally acting to compress the assembly from the opposite end; said stop including a fixed end member disposed radially of the axis of said multiple brake disk assembly, the member having an enlarged internally threaded bore in which a relatively large-diameter externally threaded stop ring is threaded in engagement with the adjacent end of the multiple brake disk assembly for adjusting the spacing of the elements of said assembly without altering the effectiveness of said releasable means, said stop ring having a mean diameter substantially equal to the mean diameter of said brake disk assembly and being coaxial therewith, and permitting access to said releasable securing means.

6. In a brake unit, a stationary supporting structure, a plurality of non-rotatable brake discs slideably mounted on said structure, a driving shaft journalled for rotation in said structure, a rotatable member having an enlarged annular brake disc carrier, means releasably securing said carrier on said shaft, a plurality of rotatable brake discs sandwiched between said non-rotatable brake discs and slideably mounted on said carrier for rotation therewith, said non-rotatable and rotatable brake discs comprising a multiple brake disk assembly, a stop beyond one end of the assembly, and releasable means normally acting to compress the assembly from the opposite end; said stop including a fixed end member disposed radially of the axis of said multiple brake disk assembly, the member having an enlarged internally threaded bore in which a relatively large-diameter externally threaded stop ring is threaded in engagement with the adjacent end of the multiple brake disk assembly for adjusting the spacing of the elements of said assembly without altering the effectiveness of said releasable means, and releasable locking means normally acting to prevent rotation of the stop ring, said stop ring having a mean diameter substantially equal to the mean diameter of said disc assembly and being coaxial therewith, and permitting access to said releasable securing means.

7. In a brake unit, a stationary supporting structure, a plurality of non-rotatable brake discs slideably mounted on said structure, a driving shaft journalled for rotation in said structure, a rotatable member having an enlarged annular brake disc carrier, means releasably securing said carrier on said shaft, a plurality of rotatable brake discs sandwiched between said non-rotatable brake discs and slideably mounted on said carrier for rotation therewith, said non-rotatable and rotatable brake discs comprising a multiple brake disk assembly, said supporting structure comprising a backing plate and a spindle extending from said backing plate, an end member mounted on said spindle, said non-rotatable brake discs of said assembly being slidably mounted on said spindle, a coil compression spring circumscribing said spindle, said end member being internally threaded, an externally threaded ring within said end wall in engagement with the adjacent end of said multiple brake disk assembly for adjusting the spacing of the elements of said assembly without altering the effectiveness of said spring, said stop ring having a mean diameter substantially equal to the mean diameter of said assembly and being coaxial therewith, and permitting access to said releasable securing means, and second releasable means securing said end member on said spindle.

8. The arrangement set forth in claim 7, wherein said ring has a tapered bore therein extending generally parallel to the axis of the ring, said ring being split radially in intersecting relationship to the tapered bore, a tapered plug within said tapered bore and a nut threaded on said tapered plug.

9. A brake unit, as in claim 6, in which said locking means comprises a taper plug, the ring having a taper bore therewithin parallel to its axis, and means to urge the plug into the taper bore and to hold the same therein, the ring being split radially in intersecting relation to said taper bore.

10. A brake unit, as in claim 9, in which said plug-urging means is a stem thereon projecting beyond one end of the ring, and a nut threaded on the stem and bearing against said end of the ring.

11. A brake unit as in claim 1 including second releasable fastening means securing said end member on said supporting structure to allow said brake disc assembly to be removed as a unit upon releasing the first-mentioned and said second releasable fastening means.

12. A brake unit as set forth in claim 11 including electromagnetic means for operating said disc assembly against the action of said means acting to compress, said electromagnetic means comprising a pair of co-operating core members which are normally separated by an air gap, one of said core members being mounted on said supporting structure and the other one of said core members being mounted on the innermost one of said non-rotatable brake discs whereby said air gap may be conveniently cleaned when said brake disc assembly is so removed.

References Cited in the file of this patent

UNITED STATES PATENTS

| | | |
|---|---|---|
| 1,490,967 | Denneen et al. | Apr. 22, 1924 |
| 1,922,307 | Lambert | Aug. 15, 1933 |
| 2,014,630 | O'Brien et al. | Sept. 17, 1935 |
| 2,076,538 | Bendix | Apr. 13, 1937 |
| 2,105,867 | Stewart | Jan. 18, 1938 |
| 2,121,889 | Sousedik | June 28, 1938 |
| 2,440,304 | Simmons | Apr. 27, 1948 |
| 2,453,237 | Le Tourneau | Nov. 9, 1948 |
| 2,491,128 | Nelson | Dec. 13, 1949 |
| 2,506,028 | Le Tourneau | May 2, 1950 |
| 2,584,190 | Danley et al. | Feb. 5, 1952 |